United States Patent [19]
Mathews et al.

[11] Patent Number: 6,134,636
[45] Date of Patent: Oct. 17, 2000

[54] METHOD AND APPARATUS FOR STORING DATA IN A MEMORY ARRAY

[75] Inventors: Gregory Scott Mathews, Santa Clara; John Wai Cheong Fu, Saratoga, both of Calif.; Dean Ahmad Mulla, Fort Collins, Colo.

[73] Assignee: Intel Corporation, Santa Clara, Calif.

[21] Appl. No.: 09/151,740

[22] Filed: Sep. 11, 1998

Related U.S. Application Data

[63] Continuation-in-part of application No. 09/001,742, Dec. 31, 1997.

[51] Int. Cl.$^7$ .............................. G06F 12/00; G06F 12/14
[52] U.S. Cl. .......................... 711/163; 711/150; 711/152
[58] Field of Search ................................... 711/163, 150, 711/152

[56] References Cited

U.S. PATENT DOCUMENTS

| | | | |
|---|---|---|---|
| 4,835,672 | 5/1989 | Zenk et al. ............................. | 711/150 |
| 4,975,833 | 12/1990 | Jinzaki .................................... | 711/152 |
| 5,283,870 | 2/1994 | Joyce et al. ............................. | 711/152 |
| 5,353,430 | 10/1994 | Lautzenheiser ........................ | 711/117 |
| 5,666,515 | 9/1997 | White et al. ............................ | 711/152 |
| 5,734,909 | 3/1998 | Bennett .................................. | 710/200 |
| 5,778,441 | 7/1998 | Rhodehamel et al. ................. | 711/154 |
| 5,829,025 | 10/1998 | Mittal ..................................... | 711/122 |
| 5,845,331 | 12/1998 | Carter et al. ........................... | 711/163 |
| 5,974,508 | 10/1999 | Maheshwari ........................... | 711/133 |
| 5,983,329 | 11/1999 | Thaler et al. .......................... | 711/163 |

*Primary Examiner*—John W. Cabeca
*Assistant Examiner*—Brian R. Peugh
*Attorney, Agent, or Firm*—David J. Kaplan

[57] ABSTRACT

A method and apparatus for storing, locking, and unlocking data in a memory array. The memory array includes a first line to store a first type of data while the first line is unlocked during a first period of time and to store a second type of data while the first line is locked during a subsequent second period of time. The memory array further includes a second line to store the second type of data while the second line is locked during the first period of time and to store the first type of data while the second line is unlocked during the second period of time.

20 Claims, 4 Drawing Sheets

METHOD AND APPARATUS FOR STORING DATA IN A MEMORY ARRAY

This is a continuation-in-part of application Ser. No. 09/001,742, filed Dec. 31, 1997.

FIELD OF THE INVENTION

The present invention relates to computer systems and more particularly to a method and apparatus for storing, locking, and unlocking data in a memory array of a processor.

BACKGROUND OF THE INVENTION

A processor manipulates and controls the flow of data in a computer system. Increasing the speed and decreasing the size of the processor will tend to increase the computational power of the computer and decrease its manufacturing cost. Processor designers employ many different techniques to increase processor speed and decrease size to create more powerful and less expensive computers for consumers. One such technique involves partitioning the memory of a computer system into hierarchical levels to improve data retrieval efficiency.

A computer uses memory to store data that may be needed by the processor at a future time. Computer memory is divided into a number of memory arrays in a memory hierarchy. According to the memory hierarchy, data that the processor will more likely use in the near future is stored in a memory array that occupies a hierarchical level closer to the processor. Data that the processor will less likely need in the near future is stored in a memory array that occupies a hierarchical level further from the processor. In this manner, data processing efficiency is improved because the more frequently used data can be more quickly accessed by the processor than the less frequently used data.

The tradeoff for quick access to data stored in a memory array close to the processor is that this array tends to be smaller than a memory array further from the processor. The memory array close to the processor is made smaller to reduce the cost of manufacturing and to boost the access speed of the array. For example, some memory arrays that are close to the processor reside on the same semiconductor substrate as the processor. Increasing the size of such an array increases the size of the processor, making the processor more expensive. In addition, the processor will take longer to access the larger array because it has more data to search through. To address this tradeoff between the speed of access of a memory array versus the size of the memory array, various algorithms are employed to better distinguish between data that will most likely be soon accessed by the processor versus data that will least likely be soon accessed.

A memory array typically comprises data arranged in data lines that are accessed, or "used", by the processor. A line replacement algorithm tracks the lines of a memory array such that a line that is less likely to be soon used is, ideally, replaced with a line that is more likely to be soon used. One of the most accurate predictors of whether a line is likely to be soon used by the processor is how recently the line was used in the past. A line that was recently used will more likely be soon used again than a line that was not recently used.

One line replacement algorithm is called a not recently used (NRU) algorithm. In an NRU algorithm, each line of a memory array has a corresponding NRU bit in an NRU table that indicates line usage. When a line is used by the processor, its corresponding NRU bit is set to a value that indicates that the line has recently been used. Once all the NRU bits of the memory array have been set to a value that indicates that their corresponding lines have recently been used, all the NRU bits are reset. Resetting the NRU bits changes the value of the NRU bits to indicate that the lines have not recently been used. This changes the status of all the lines to NRU lines. When the processor needs to replace a line in the array with new data, the processor searches for and replaces a NRU line with the new data.

One problem with the NRU line replacement algorithm is that the moment the NRU bits are reset, there is no longer any indication as to which line has recently been used. As a result, the processor might replace a more recently used line, rather than a less recently used line, with new data, causing inefficient use of the memory array. In addition, the NRU algorithm can be time consuming for large memory arrays due to the time it takes to search large arrays for an NRU line.

An alternative line replacement algorithm is called a least recently used (LRU) algorithm. In an LRU algorithm, each line of a memory array has a corresponding entry in an LRU table that indicates line usage. When a line is used by the processor, its corresponding LRU table entry is set to a value that indicates that the line has been most recently used. When this line is set to a most recently used status, the previous most recently used line is set to a second most recently used status. The previous second most recently used line is set to a third most recently used status. The previous third most recently used line is set to a fourth most recently used status. And so forth. When the processor needs to replace a line in the array with new data, the processor searches for and replaces the least most recently used line (the LRU line), indicated by the value of its LRU table entry.

One problem with the LRU line replacement algorithm is that it is expensive to implement because it requires a lot of memory and logic space. Each entry in the LRU table comprises numerous bits for each line, and several entries in the table may be modified each time a new line is elevated to most recently used status. This requires quite a bit of data manipulation.

SUMMARY OF THE INVENTION

A method and apparatus for storing, locking, and unlocking data in a memory array is described. The memory array includes a first line to store a first type of data while the first line is unlocked during a first period of time and to store a second type of data while the first line is locked during a subsequent second period of time. The memory array further includes a second line to store the second type of data while the second line is locked during the first period of time and to store the first type of data while the second line is unlocked during the second period of time.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus for managing a memory array is described using a new line replacement algorithm. The new algorithm balances the benefits and drawbacks of both the not recently used (NRU) algorithm and the least recently used (LRU) algorithm to achieve a more optimized solution. In accordance with one embodiment of the present invention, the new algorithm is implemented on a fully associative memory array that is divided into two or more regions.

A NRU algorithm is used to track lines in each region of the array such that the NRU bits are reset on a region-by-region basis. That is, the NRU bits of one region are reset when all of the bits in that region indicate that their corresponding lines have recently been used. Similarly, the NRU bits of another region are reset when all of the bits in that region indicate that their corresponding lines have recently been used. Resetting the NRU bits in one region, however, does not affect the NRU bits in another region.

A LRU algorithm is used to track the regions of the array such that each region has a single, corresponding entry in a LRU table. That is, all the lines in a single region collectively correspond to a single LRU entry. A region is elevated to most recently used status in the LRU table once the NRU bits of the region are reset according to the above-described NRU algorithm. The prior most recently used region is demoted to second most recently used status in the LRU table. The prior second most recently used region is demoted to third most recently used status in the LRU table, and so forth. The processor then replaces a NRU line in the LRU region with new data.

One advantage to an embodiment of the present invention is that the amount of memory storage space and logic area is reduced in comparison to prior LRU algorithms. This is because each LRU entry in accordance with an embodiment of the present invention corresponds to a plurality of lines in the memory array rather than to each line. This reduces the size and complexity of the LRU table. Another advantage is that the speed of searching for the NRU line is improved because the processor need only search the relatively small LRU region for the NRU line rather than the entire array. Another advantage is that after resetting the NRU bits of a region, a line that was recently used in the region will not be immediately replaced with new data because the region, as a most recently used region, will not be selected as a replacement candidate. A more detailed description of embodiments of the present invention, including various configurations and implementations, is provided below.

Figure 1A:
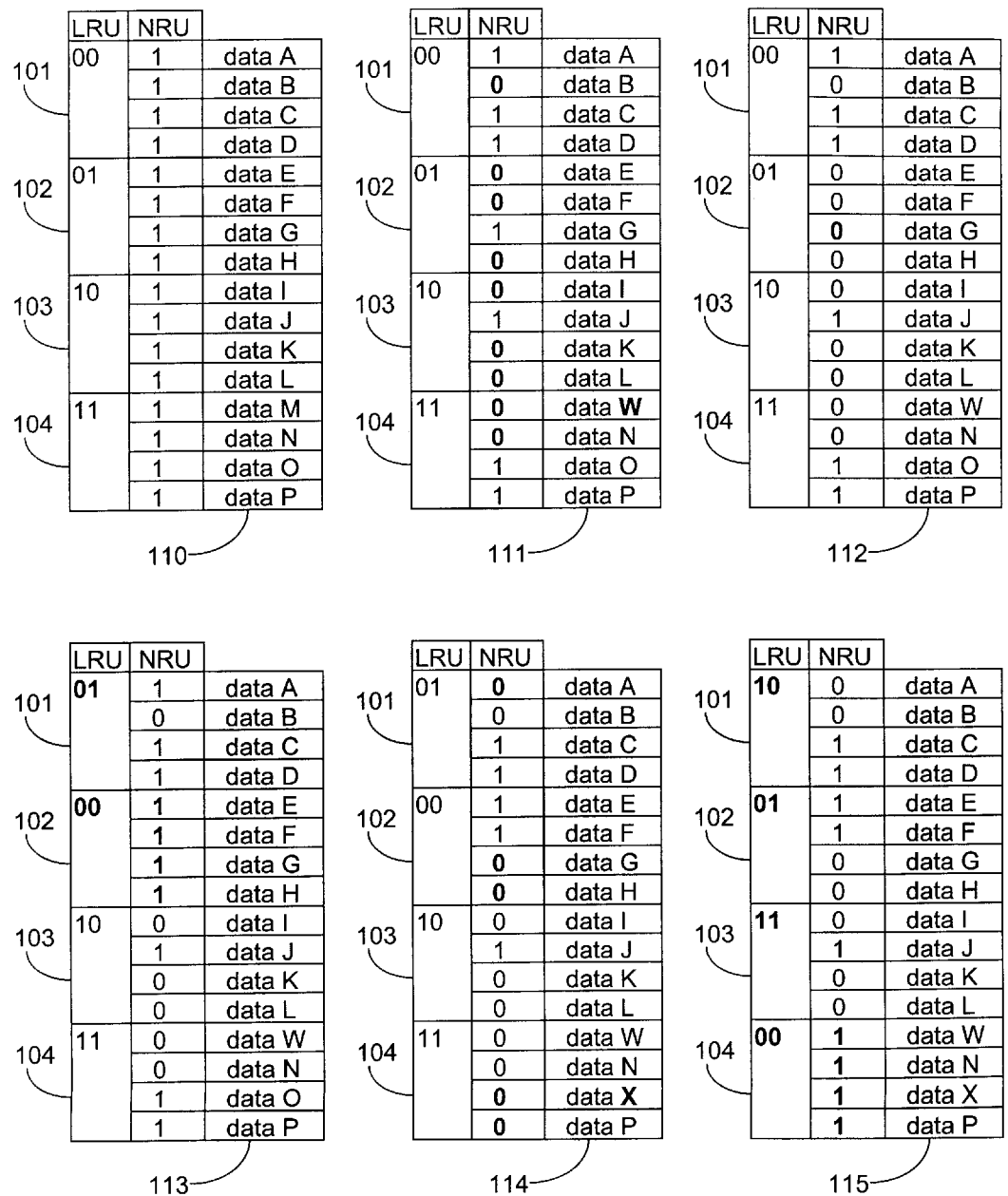
FIGS. 1a and 1b show line usage in a memory array in accordance with an embodiment of the present invention.
Figure 1B:
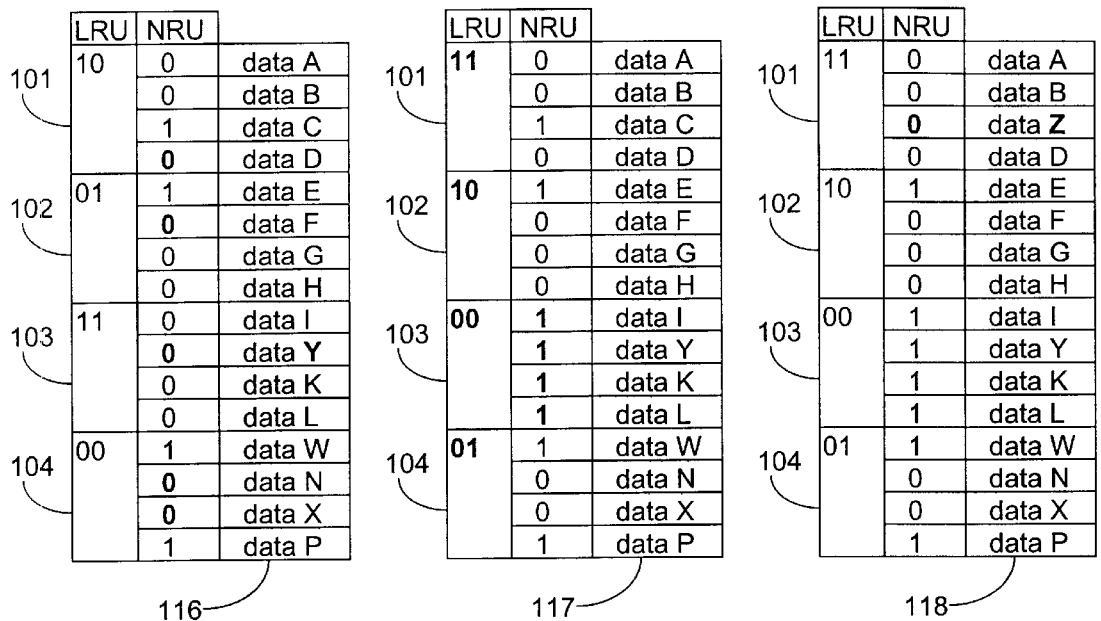
Figure 1B:
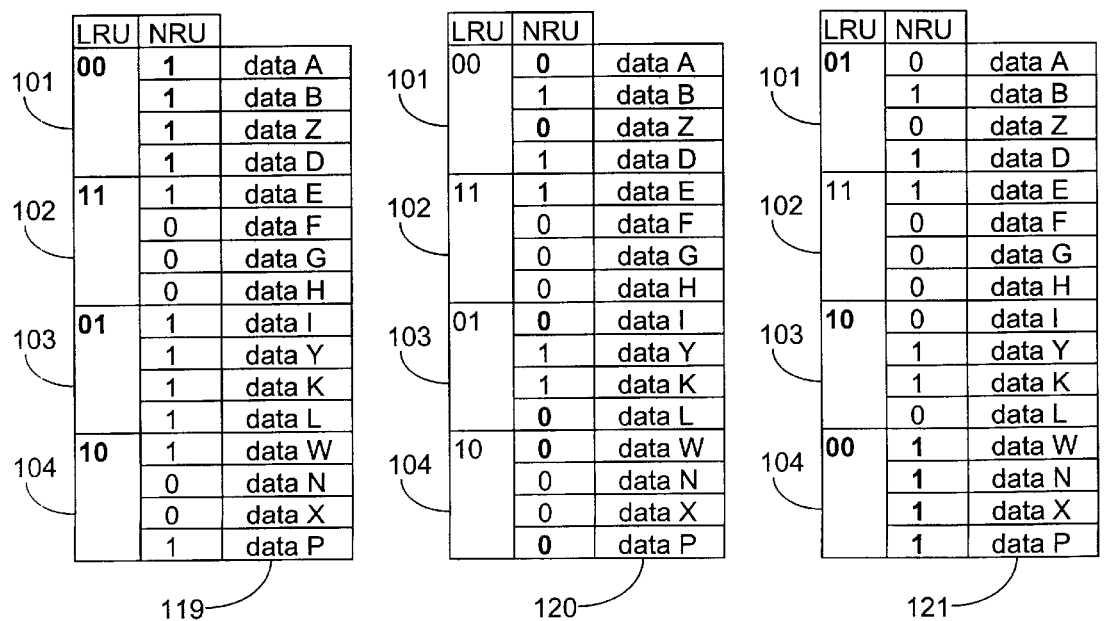

FIGS. 1a and 1b show line usage in a memory array at twelve different points in time in accordance with an embodiment of the present invention. For clarity, changes to entries in the LRU table, NRU bits, or data in the data lines from previous points in time are shown in bold. At time 110, the initial values in the memory array are shown. The memory array is divided into four regions, each region corresponding to a single entry in the LRU table (or LRU column, as shown here). Each region comprises four lines. Each line corresponds to an NRU bit in the NRU table (or NRU column, as shown here). For an alternate embodiment of the present invention, the memory array may be any size, divided into any number of regions, each having any number of lines. The memory array designer selects the appropriate number of lines, regions, and lines per region, to appropriately optimize the memory structure in terms of physical size and access speed using the techniques described herein.

FIGS. 1a and 1b indicate that each region of the memory array corresponds to an entry in a LRU table. This LRU table may be a reserved portion of the memory array itself such that the LRU entries are stored in the memory array, or the LRU table may be contained in a separate memory array. For simplicity, a LRU algorithm, including a LRU table, is described herein. The LRU algorithm described herein, however, is to be considered to encompass a most recently used (MRU) algorithm or any other similar algorithm that, at any given time, provides information on the historical use of one value in comparison to another (in contrast to a NRU algorithm which, upon reset, loses this information). In addition, although positive logic is described in conjunction with the LRU algorithm of FIGS. 1a and 1b, an alternate embodiment may implement negative logic.

FIGS. 1a and 1b indicate that each line of the memory array has a correspond NRU bit. These NRU bits may be stored in a reserved portion of the memory array itself or may be contained in a separate NRU table. For simplicity, a NRU algorithm, including NRU bits, is described herein. The NRU algorithm described herein, however, is to be considered to encompass a recently used (RU) algorithm or any other similar algorithm. In addition, although positive logic is described in conjunction with the NRU algorithm of FIGS. 1a and 1b, an alternate embodiment may implement negative logic.

The memory array at time 110 of FIG. 1a shows the memory array divided into four regions, 101–104. Region 101 has a single LRU entry of "00" indicating that this region is the most recently used region (or, alternatively, the fourth least recently used region). Region 101 includes four data lines containing data A–D, respectively, each data line having a corresponding NRU bit set to "1", making each data line an NRU line, indicating that each line has not recently been used (or, alternatively, the NRU bits of the region have been recently reset). Region 102 has a single LRU entry of "01" indicating that this region is the second most recently used region (or, alternatively, the third least recently used region). Region 102 includes four data lines containing data E–H, respectively, each data line having a corresponding NRU bit set to "1". Region 103 has a single LRU entry of "10" indicating that this region is the third most recently used region (or, alternatively, the second least recently used region). Region 103 includes four data lines containing data I–L, respectively, each data line having a corresponding NRU bit set to "1". Region 104 has a single LRU entry of "11" indicating that this region is the LRU region (or, alternatively, the fourth most recently used region). Region 104 includes four data lines containing data M–P, respectively, each data line having a corresponding NRU bit set to "1".

In accordance with one embodiment of the present invention, the memory array of FIGS. 1a and 1b is a fully associative array. For an alternate embodiment of the present invention, the memory array is modified to be a set associative array. For example, an embodiment of the present invention may be used within a set of a set associative array. For one embodiment of the present invention, the memory array is a translation lookaside buffer or serial translation buffer in the processor of the computer system and contains virtual to physical address translations for addresses accessed by the processor. For another embodiment, the memory array is an address, data, or combined address and data cache or buffer inside or outside the processor.

At time 111, various lines of the memory array of FIG. 1a have been read or written. As used herein, a processor that reads data from a line of the memory array or writes data to a line of the memory array is said to have used that line of the memory array. As shown at time 111, the line containing data B in region 101, the lines containing data E, F, and H in region 102, the lines containing data I, K, and L in region 103, and the line containing data N in region 104 have been read. In addition, the line containing data M of region 104 has been replaced with a new line containing data W. The line containing data M was selected for replacement with new data W because it was the first NRU line in the LRU region 104. All lines that have been used at time 111 have their corresponding NRU bits set to "0", indicating that the lines have recently been used. None of the corresponding entries in the LRU table change.

At time 112 of FIG. 1a, the line containing data G in region 102 has been used. At this time, all of the NRU bits of region 102 are set to "0", indicating that their corresponding lines, containing data E–H, have been used. The NRU bits of region 102 are then reset, making each line a NRU line, and the region is given most recently used status in the LRU table as shown at time 113. The entry in the LRU table corresponding to region 102 is changed to "00". The previous most recently used region, region 101, is downgraded (or upgraded, depending on the perspective) to second most recently used status, and its entry in the LRU table is changed to "01". None of the other entries in the LRU table change because their status stays the same.

As shown at time 114 of FIG. 1a, the lines containing data A, G, H, and P have been used, and their corresponding NRU bits are set to "0". In addition, the line containing data O of region 104 has been replaced with a new line containing data X, and the new line's corresponding NRU bit is set to "0". The line containing data O was selected for replacement because it was the first NRU line in the LRU region 104. At this time, all of the NRU bits of region 104 are set to "0", indicating that their corresponding lines have all been used.

The NRU bits of region 104 are reset, making each line an NRU line, and region 104 is set to most recently used status in the LRU table as shown at time 115 of FIG. 1a. The entry in the LRU table corresponding to region 104 is changed to "00". The previous most recently used region, region 102, is set to second most recently used status, and its entry in the LRU table is changed to "01". The previous second most recently used region, region 101, is set to third most recently used status, and its entry in the LRU table is changed to "10". The previous third most recently used region, region 103, is set to fourth most recently used status (i.e. LRU status for this embodiment of the present invention), and its entry in the LRU table is changed to "11", making region 103 the new LRU region.

As shown at time 116 of FIG. 1b, the lines containing data D, F, N, and X have been used, and their corresponding NRU bits have been set to "0". In addition, the line containing data J of region 103 has been replaced with a new line containing data Y, and the new line's corresponding NRU bit is set to "0". The line containing data J was selected for replacement because it was the first NRU line in the LRU region 103. At this time, all of the NRU bits of region 103 are set to "0", indicating that their corresponding lines have all been used.

The NRU bits of region 103 are reset, making each line an NRU line, and region 103 is set to most recently used status in the LRU table as shown at time 117 of FIG. 1b. The entry in the LRU table corresponding to region 103 is changed to "00". The previous most recently used region, region 104, is set to second most recently used status, and its entry in the LRU table is changed to "01". The previous second most recently used region, region 102, is set to third most recently used status, and its entry in the LRU table is changed to "10". The previous third most recently used region, region 101, is set to LRU status, and its entry in the LRU table is changed to "11", making region 101 the new LRU region.

As shown at time 118 of FIG. 1b, the line containing data C of region 101 has been replaced with a new line containing data Z, and the new line's corresponding NRU bit is set to "0". The line containing data C was selected for replacement because it was the first NRU line in the LRU region 101. At this time, all of the NRU bits of region 101 are set to "0", indicating that their corresponding lines have all been used.

The NRU bits of region 101 are reset, making each line an NRU line, and region 101 is set to most recently used status in the LRU table as shown at time 119 of FIG. 1b. The entry in the LRU table corresponding to region 101 is changed to "00". The previous most recently used region, region 103, is set to second most recently used status, and its entry in the LRU table is changed to "01". The previous second most recently used region, region 104, is set to third most recently used status, and its entry in the LRU table is changed to "10". The previous third most recently used region, region 102, is set to LRU status, and its entry in the LRU table is changed to "11", making region 102 the new LRU region.

As shown at time 120 of FIG. 1b, the lines containing data A, Z, I, L, W, and P have been used, and their corresponding NRU bits have been set to "0". At this time, all of the NRU bits of region 104 are set to "0", indicating that their corresponding lines have all been used.

The NRU bits of region 104 are reset, making each line an NRU line, and region 104 is set to most recently used status in the LRU table as shown at time 121 of FIG. 1b. The entry in the LRU table corresponding to region 104 is changed to "00". The previous most recently used region, region 101, is set to second most recently used status, and its entry in the LRU table is changed to "01". The previous second most recently used region, region 103, is set to third most recently used status, and its entry in the LRU table is changed to "10". The previous LRU region, region 102, maintains its status as the LRU region of the memory array.

Figure 2:
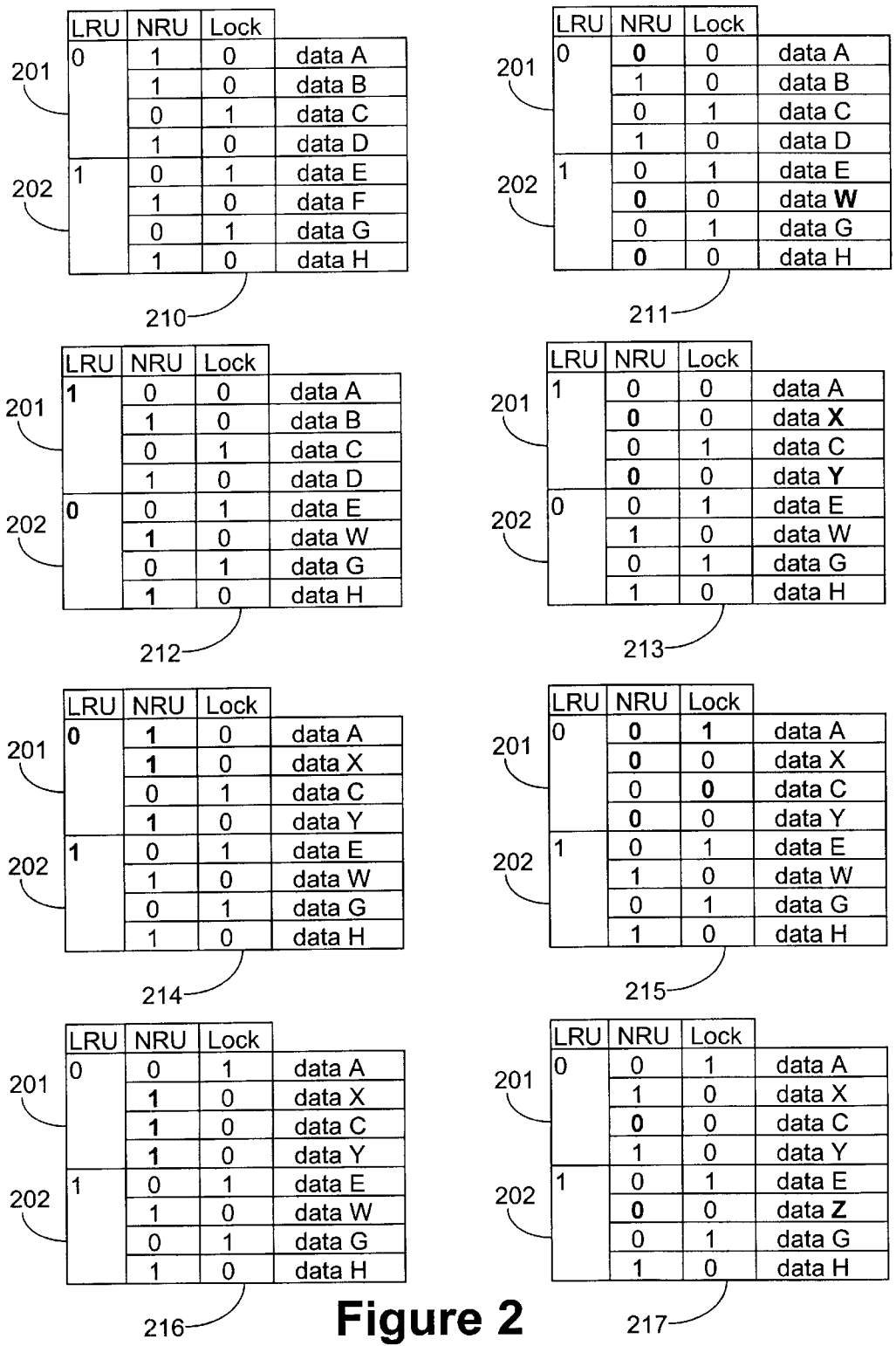
FIG. 2 shows line usage in a memory array in accordance with another embodiment of the present invention.

FIG. 2 shows line usage in a memory array in accordance with an alternate embodiment of the present invention in which lock bits are implemented. The Lock bits may be stored in a reserved portion of the memory array itself or may be contained in a separate Lock table. For the embodiment of FIG. 2, a lock bit that is set to a logical "1" indicates that the line is locked, and a logical "0" indicates that the line is unlocked. In accordance with an alternate embodiment of the present invention, a lock bit that is set to a logical "0" indicates that the line is locked, and a logical "1" indicates that the line is unlocked. Alternatively, any number of bits may be used to indicate the locked/unlocked status of a line of the memory array. A locked line prevents its NRU bit from being set to "1", thereby preventing the line from becoming an NRU line. Because a locked line cannot become an NRU line, then, according to the line replacement algorithm described above, the line cannot be replaced with new data by the processor.

This locking mechanism may be found useful for an embodiment of the present invention in which one desires to store relatively infrequently used data (i.e. non-temporal data) in the memory array for an extended period of time. By locking the line in which the data is stored (using, for example, explicit program instructions), the line will not be replaced with new data. Meanwhile, frequently used data (i.e. temporal data) may be stored in other lines of the memory array that remain unlocked and are subject to replacement.

For an embodiment of the present invention in which the memory array is a translation buffer, non-temporal data may include critical virtual to physical memory translations for input-output spaces, kernel memory areas, frame buffers, page tables, and sensitive interrupt codes. For this embodiment, lines may be locked in response to, for example, special translation data insertion instructions. Lines may be unlocked in response to, for example, a purge instruction. Temporal data may include other, non-critical, dynamic translations that are swapped in and out of the translation buffer in accordance with cache management techniques that exploit temporal and spatial locality.

For clarity, changes to entries in the LRU table, NRU bits, or data in the data lines from previous points in time are shown in bold. At time 210, the initial values in the memory array are shown in FIG. 2. The memory array is divided into two regions, each region corresponding to a single entry in the LRU table (or LRU column, as shown here). Each region comprises four lines. Each line has a corresponds to an NRU bit in the NRU table (or NRU column, as shown here). In addition, each line corresponds to a Lock bit in the Lock table (or Lock column, as shown here).

The memory array at time 210 of FIG. 2 shows the memory array divided into two regions, 201 and 202. Region 201 has a single LRU entry of "0" indicating that this region is the most recently used region (or, alternatively, the second least recently used region). Region 201 includes four data lines containing data A–D, respectively. Each data line of region 201 has a corresponding NRU bit set to "1" and a Lock bit set to "0" with the exception of the line containing data C. The line containing data C has a Lock bit set to "1" and, consequently, a NRU bit set to "0". Region 202 has a single LRU entry of "1" indicating that this region is the LRU region (or, alternatively, the second most recently used region). Region 201 includes four data lines containing data E–H, respectively. The lines of region 201 containing data F and H have corresponding NRU bits set to "1" and Lock bits set to "0". The lines containing data E and G have Lock bits set to "1" and, consequently, NRU bits set to "0".

In accordance with one embodiment of the present invention, the memory array is designed to prevent all the lines in a region from being locked at the same time. Alternatively, a memory array designed to allow all the lines in a region to be locked at the same time is further designed to prevent such a region from becoming the LRU region of the array while all its lines are locked. This ensures that there will always be an NRU line in the LRU region of the array when the processor searches for a line to replace with new data.

For one embodiment of the present invention, only every other line in a region may be locked (e.g. only even or only odd lines). For another embodiment, the total number of simultaneously lockable lines (those lines that can be locked according to the algorithm implemented) of the array is limited to a predetermined number. In accordance with one embodiment, lockable lines of a first region are locked before lines of other regions become locked. Alternatively, a hardware or software mechanism ensures that each of a plurality of regions contains one locked line before two lines of any one region are allowed to become locked. Similarly, the mechanism ensures that each of the plurality of regions contains two locked lines before three lines of any one region are allowed to become locked, and so forth. This embodiment may be found useful to more evenly distribute the total number of lines available for replacement among the regions of the array so that a bias towards any particular region becoming the LRU region is reduced. For one embodiment, the insertion of lock lines follows the above-described algorithm. For an alternate embodiment, the insertion of lock lines (or locking of lines) follows an alternate algorithm.

As shown at time 211 of FIG. 2, the lines containing data A and H have been used, and their corresponding NRU bits are set to "0". In addition, the line containing data F of region 202 has been replaced with a new line containing data W, and the new line's corresponding NRU bit is set to "0". The line containing data F was selected for replacement because it was the first NRU line in the LRU region 202. At this time, all of the NRU bits of region 202 are set to "0", indicating that their corresponding lines have all been used. Note that this is a somewhat misleading indication because the lines containing data E and G may not have been used, but because these lines are locked, their NRU bits are set to "0", indicating to the processor that the lines have been used.

The NRU bits of region 202 are reset, making all but the locked lines NRU lines, and region 202 is set to most recently used status in the LRU table as shown at time 212 of FIG. 2. Note that when a region containing locked lines is reset, only unlocked lines are actually reset to "1", the NRU bits of the locked lines remain set to "0". The entry in the LRU table corresponding to region 202 is changed to "0". The previous most recently used region, region 201, becomes the new LRU region, and its entry in the LRU table is changed to "1".

As shown at time 213 of FIG. 2, the lines containing data B and D of region 201 have been replaced with new lines containing data X and Y, respectively, and the new lines' corresponding NRU bits are set to "0". The lines containing data B and D were selected for replacement because they were the first NRU lines in LRU region 201. At this time, all of the NRU bits of region 201 are set to "0", indicating that their corresponding lines have all been used.

The NRU bits of region 201 are reset, making all but the locked line NRU lines, and region 201 is set to most recently used status in the LRU table as shown at time 214 of FIG. 2. Note that when region 201 is reset, only unlocked lines are actually reset to "1", the NRU bit of the locked line containing data C remains set to "0". The entry in the LRU table corresponding to region 201 is changed to "0". The previous most recently used region, region 202, becomes the new LRU region, and its entry in the LRU table is changed to "1".

As shown at time 215 of FIG. 2, the lines containing data A, X, and Y have been used, and their corresponding NRU bits are set to "0". At this time, all of the NRU bits of region 201 are set to "0", indicating that their corresponding lines have all been used. In addition, special instructions are executed by the processor to unlock the line containing data C and to lock the line containing A. Thus, the line containing data C rejoins the pool of replaceable entries, and may be replaced upon reset of its corresponding NRU bit when region 201 next becomes the LRU region. Similarly, the line containing data A is removed from the pool of replaceable entries. The NRU bits of region 201 are subsequently reset, making all but the locked line NRU lines, and region 201 retains its most recently used status in the LRU table as shown at time 216 of FIG. 2.

As shown at time 217 of FIG. 2, the line containing data W of region 202 has been replaced with a new line containing data Z, and the new line's corresponding NRU bit is set to "0". The line containing data W was selected for replacement because it was the first NRU line in the LRU region 202. In addition, the line containing data C is used, and its corresponding NRU bit is set to "0".

Figure 3:
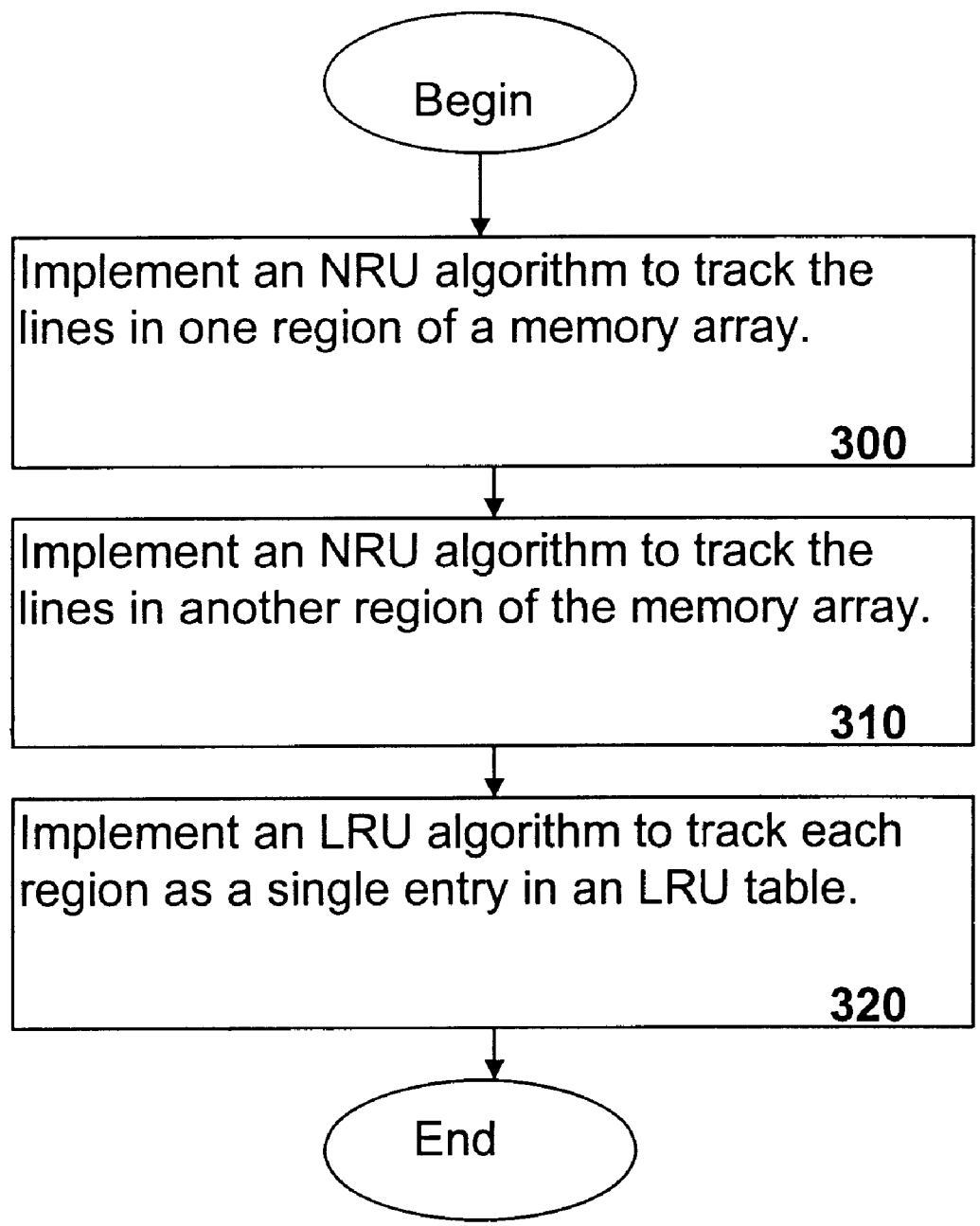
FIG. 3 is a flow chart showing a method of the present invention.

FIG. 3 is a flow chart showing a method of the present invention implemented in conjunction with a memory array divided into lines and regions as described above. At step 300 an NRU algorithm is implemented to track the lines in one region of the array. At step 310 an NRU algorithm is implemented to track the lines in another region of the array. At step 320 an LRU algorithm is implemented to track each region as a single entry in an LRU table. The line selected for replacement is an NRU line in the LRU region. For one embodiment, the first NRU line of the LRU region is selected for replacement. For another embodiment, the last NRU line of the LRU region is selected for replacement.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A memory array comprising:
   a first line to store temporal data while the first line is unlocked during a first period of time, and to store non-temporal data while the first line is locked during a subsequent second period of time; and
   a second line to store non-temporal data while the second line is locked during the first period of time, and to store temporal data while the second line is unlocked during the second period of time.

2. The memory array of claim 1, the first and second lines to additionally store lock bits.

3. The memory array of claim 2, wherein a lock bit of the first line is to be set to a first predetermined value during the first period of time and set to a second predetermined value during the second period of time, and a lock bit of the second line is to be set to the second predetermined value during the first period of time and set to the first predetermined value during the second period of time.

4. The memory array of claim 3, wherein the first predetermined value is a value that prevents an associated line from being replaced, and the second predetermined value is a value that allows an associated line to be replaced.

5. The memory array of claim 1, the first line to store temporal data while the first line is unlocked during a subsequent third period of time, the second line to store non-temporal data while the second line is locked during the subsequent third period of time.

6. The memory array of claim 1, wherein the temporal and non-temporal data are virtual to physical address translations.

7. A processor comprising:
   a unit to access a virtual address; and
   a memory array to translate the virtual address into a physical address, the memory array including a plurality of lines to be locked and unlocked to accommodate the storage of both temporal and non-temporal data in the memory array simultaneously.

8. A processor comprising:
   a unit to access a virtual address; and
   a memory array to translate the virtual address into a physical address, the memory array including a plurality of lines to be locked and unlocked to accommodate the storage of both temporal and non-temporal data in the memory array simultaneously, the plurality of lines comprising a line to be unlocked while storing temporal data, and locked while storing non-temporal data.

9. The processor of claim 7, wherein the temporal and non-temporal data includes virtual to physical address translations.

10. A processor comprising:
    a unit that accesses an address; and
    a memory array that stores information used to translate the address from a virtual address into a physical address, the memory array including a locked line that stores infrequently used data for an extended period of time, and an unlocked line, the memory array comprising a predetermined maximum number of lines that can simultaneously have a locked status, the predetermined maximum number being less than a total number of lines in the memory array.

11. The processor of claim 10, wherein a lock bit indicating the locked status of the locked line is stored in the locked line, and a lock bit indicating the unlocked status of the unlocked line is stored in the unlocked line.

12. The processor of claim 10, wherein the unlocked line stores temporal data.

13. The processor of claim 10, wherein non-temporal data is stored in the unlocked line and, in response to a program instruction, the unlocked line becomes locked.

14. The processor of claim 10, wherein the locked line becomes unlocked.

15. The processor of claim 10, wherein the infrequently used data is a critical virtual to physical memory translation.

16. A method for managing data in a memory array comprising:
    storing non-temporal data in a line of the memory array and locking the line in response to the execution of a single instruction;
    maintaining locked status of the line while the non-temporal data is stored in the line;
    unlocking the line;
    storing temporal data in the line; and
    maintaining unlocked status of the line while the temporal data is stored in the line.

17. The method of claim 16, wherein unlocking the line is performed in response to a purge instruction.

18. The method of claim 16, wherein storing non-temporal data and locking the line includes setting a lock bit stored in the line to a value that indicates the locked status of the line.

19. The method of claim 18, wherein unlocking the line includes setting the lock bit to a value that indicates the unlocked status of the line.

20. The method of claim 16, wherein the memory array is a translation buffer.

* * * * *